United States Patent
Cho et al.

(10) Patent No.: US 8,767,613 B2
(45) Date of Patent: Jul. 1, 2014

(54) METHOD AND APPARATUS FOR ALLOCATING WIRELESS RESOURCE IN WIRELESS COMMUNICATION SYSTEM INCLUDING RELAY STATION

(75) Inventors: Han Gyu Cho, Anyang-si (KR); Jin Young Chun, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 194 days.

(21) Appl. No.: 13/394,760

(22) PCT Filed: Sep. 17, 2010

(86) PCT No.: PCT/KR2010/006395
§ 371 (c)(1),
(2), (4) Date: Mar. 7, 2012

(87) PCT Pub. No.: WO2011/037375
PCT Pub. Date: Mar. 31, 2011

(65) Prior Publication Data
US 2012/0207081 A1    Aug. 16, 2012

Related U.S. Application Data

(60) Provisional application No. 61/244,837, filed on Sep. 22, 2009.

(30) Foreign Application Priority Data

Sep. 17, 2010  (KR) ......................... 10-2010-0091379

(51) Int. Cl.
*H04B 7/14*  (2006.01)

(52) U.S. Cl.
USPC ........................................ 370/315; 370/474

(58) Field of Classification Search
USPC ......... 370/315, 329–330, 335–338, 341–345, 370/348, 389, 392, 436–437, 441–444, 465, 370/468, 478–480
See application file for complete search history.

(56) References Cited

U.S. PATENT DOCUMENTS

| 7,952,989 B2 * | 5/2011 | Qi et al. ........................ 370/208 |
| 8,254,247 B2 * | 8/2012 | Kang et al. .................... 370/208 |
| 8,391,127 B2 * | 3/2013 | Chun et al. .................... 370/203 |

(Continued)

FOREIGN PATENT DOCUMENTS

| KR | 10-2007-0080367 | 8/2007 |
| KR | 10-2008-0047001 | 5/2008 |
| KR | 10-2008-0075668 | 8/2008 |

OTHER PUBLICATIONS

Srinivasan, Roshni et al., *IEEE 802.16m System Description Document (SDD)*, Jul. 27, 2009.

*Primary Examiner* — Kevin Mew
(74) *Attorney, Agent, or Firm* — Mckenna Long & Aldridge LLP

(57) ABSTRACT

Provided are a method and an apparatus for allocating a wireless resource in a wireless communication system including a relay station. A sub-channelization parameter for a relay zone is transmitted and a wireless resource is allocated to a relay station on the basis of the sub-channelization parameter. The relay zone is the zone for transmitting a signal from a base station to the relay station or receiving the signal from the relay station within a frame and the wireless resource allocated in the relay station is the remaining physical resource units (PRUs) except the PRUs allocated in a distributed resource unit (DRU).

13 Claims, 14 Drawing Sheets

(56) References Cited

U.S. PATENT DOCUMENTS

| | | | |
|---|---|---|---|
| 8,462,743 B2* | 6/2013 | Kovacs et al. | 370/338 |
| 2008/0095195 A1* | 4/2008 | Ahmadi et al. | 370/478 |
| 2011/0122846 A1* | 5/2011 | Yu et al. | 370/335 |
| 2011/0317614 A1* | 12/2011 | Park et al. | 370/315 |
| 2011/0317619 A1* | 12/2011 | Lim et al. | 370/315 |
| 2012/0063386 A1* | 3/2012 | Park et al. | 370/315 |
| 2012/0121028 A1* | 5/2012 | Kim et al. | 375/259 |
| 2012/0170506 A1* | 7/2012 | Chun et al. | 370/315 |

* cited by examiner

METHOD AND APPARATUS FOR ALLOCATING WIRELESS RESOURCE IN WIRELESS COMMUNICATION SYSTEM INCLUDING RELAY STATION

CROSS-REFERENCE TO RELATED APPLICATIONS

This application is a 35 U.S.C. §371 National Stage Entry of International Application No. PCT/KR2010/006395, filed on Sep. 17, 2010, and claims the benefit of priority to U.S. Provisional Application No. 61/244,837, filed on Sep. 22, 2009, and Korean Patent Application No. 10-2010-0091379, filed on Sep. 17, 2010, all of which are hereby incorporated by reference in their entirety for all purposes as if fully set forth herein.

BACKGROUND OF THE INVENTION

1. Field of the Invention

The present invention relates to wireless communications, and more particularly, to a method and apparatus for allocating wireless resources in a wireless communication system including a relay station.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

Technology for supporting reliable and high-speed data service may include multiple input multiple output (MIMO). MIMO technology can be used to improve the efficiency of data transmission and reception using multiple transmission antennas and multiple reception antennas. MIMO technology includes spatial multiplexing, transmit diversity, beam-forming and the like. An MIMO channel matrix according to the number of reception antennas and the number of transmission antennas can be decomposed into a number of independent channels. Each of the independent channels is called a layer or stream. The number of layers is called a rank.

A wireless communication system including a relay station (RS) has recently been developed. The RS is employed for cell coverage extension and transmission capability improvement. A BS provides a service to an MS located in a coverage boundary of the BS via the RS, and thus can obtain an effect of extending the cell coverage. In addition, the RS improves signal transmission reliability between the BS and the MS, thereby improving transmission capacity. The RS can be used when the MS is located in a shadow area even if the MS is located within the coverage of the BS.

In general, the BS and the RS are located in fixed positions. Therefore, there is a high possibility that link quality between the BS and the RS is better than link quality between the BS and the UE. Therefore a method of allocating a wireless resource for data transmission between the BS and the RS may be different from a method of allocating a wireless resource for data transmission between the BS and the UE. Accordingly, there is a need for a method of effectively allocating a wireless resource between the BS and the RS.

SUMMARY OF THE INVENTION

The present invention provides a method and apparatus for allocating a wireless resource in a wireless communication system including a relay station.

In an aspect, a method for allocating a wireless resource in a wireless communication system including a relay station is provided. The method includes transmitting a subchannelization parameter for a relay zone, and allocating the wireless resource to the relay station on the basis of the subchannelization parameter, wherein the relay zone is a region for transmitting a signal from a base station to the relay station or receiving the signal from the relay station within a frame, and wherein the wireless resource allocated to the relay station is the remaining physical resource units (PRUs) other than PRUs allocated to a distributed resource unit (DRU). The wireless resource allocated to the relay station may be allocated to a subband contiguous resource unit (CRU). The wireless resource allocated to the relay station may be determined on the basis of a physical subband index of the PRUs in a physical domain. The PRU allocated to the DRU may be included in some or all of a plurality of frequency partitions. The subchannelization parameter may include at least one of the number of frequency partitions, the number of CRUs in a specific frequency partition, and the number of subband CRUs or subband DRUs in a first frequency partition. The subchannelization parameter may be transmitted through one of a superframe header (SFH), an advanced broadcast information (ABI), a message, and a MAP. The method may further include transmitting a signal indicating a usage of the wireless resource allocated to the relay station. The method may further include transmitting a relay station presence signal indicating the presence of the relay station. The relay station presence signal may be transmitted through an SFH or an ABI.

In another aspect, an apparatus for allocating a wireless resource is provided. The apparatus includes a radio frequency (RF) unit for transmitting and receiving a radio signal, and a processor coupled to the RF unit, wherein the processor is configured for transmitting a subchannelization parameter for a relay zone, and allocating the wireless resource to the relay station on the basis of the subchannelization parameter, wherein the relay zone is a region for transmitting a signal from a base station to the relay station or receiving the signal from the relay station within a frame, and wherein the wireless resource allocated to the relay station is the remaining physical resource units (PRUs) other than PRUs allocated to a distributed resource unit (DRU). The wireless resource allocated to the relay station may be allocated to a subband contiguous resource unit (CRU). The wireless resource allocated to the relay station may be determined on the basis of a physical subband index of the PRUs in a physical domain. The PRU allocated to the DRU may be included in some or all of a plurality of frequency partitions.

In a wireless communication system including a relay station, a wireless resource can be effectively allocated by using subchannelization of a relay zone in a frame for transmitting a signal to the relay signal or receiving the signal from the relay station.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
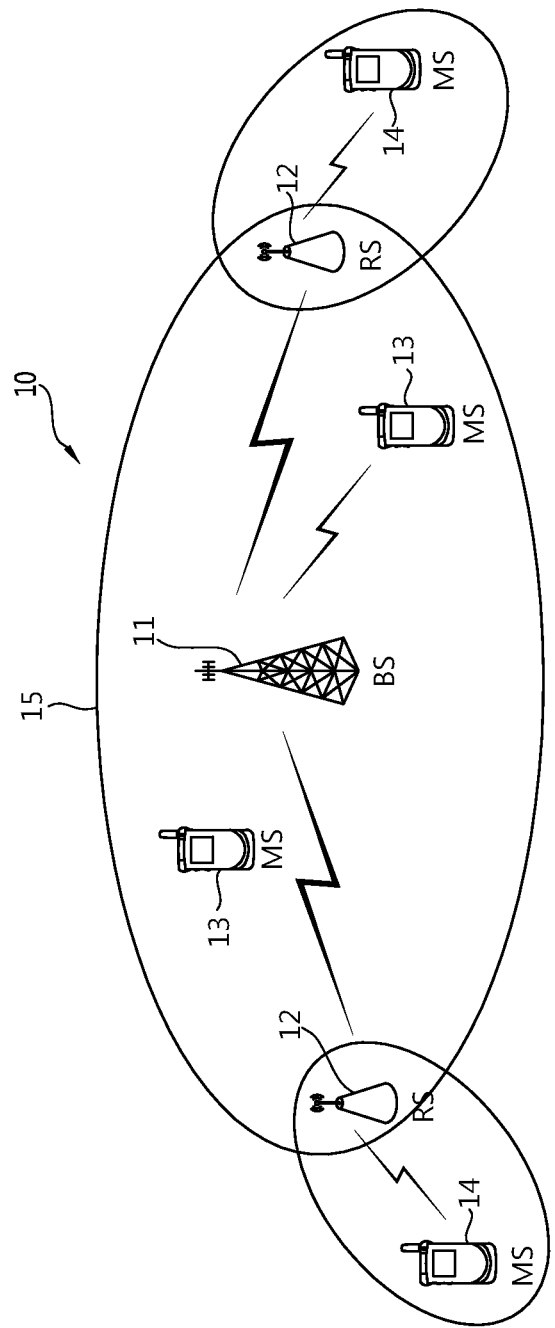
FIG. 1 shows a wireless communication system including a relay station.

FIG. 1 shows a wireless communication system including a relay station.

Referring to FIG. 1, a wireless communication system 10 including a relay station (RS) 12 includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a mobile station (MS) 13 and may be referred to as another terminology, such as an evolved node-B (eNB), a base transceiver system (BTS), an access point, an access network (AN), an advanced BS (ABS), etc. The BS 11 can perform functions such as connectivity between the RS 12 and an MS 14, management, control, resource allocation, etc.

The RS 12 is a device for relaying a signal between the BS 11 and the MS 14, and is also referred to as another terminology such as a relay node (RN), a repeater, an advanced RS (ARS), etc. A relay scheme used in the RS may be either amplify and forward (AF) or decode and forward (DF), and the technical features of the present invention are not limited thereto.

The MSs 13 and 14 may be fixed or mobile, and may be referred to as another terminology, such as a an advanced mobile station (AMS), a user terminal (UT), a subscriber station (SS), a wireless device, a personal digital assistant (PDA), a wireless modem, a handheld device, an access terminal (AT), a user equipment (UE), etc. Hereinafter, a macro MS denotes an MS that directly communicates with the BS 11, and a relay MS denotes an MS that communicates with the RS. To improve a data transfer rate depending on a diversity effect, a macro MS 13 located in the cell of the BS 11 can also communicate with the BS 11 via the RS 12.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). Between the BS and the macro MS, a downlink (DL) denotes communication from the BS to the macro MS, and an uplink (UL) denotes communication from the macro MS to the BS. Between the BS and the RS, a DL denotes communication from the BS to the RS, and a UL denotes communication from the RS to the BS. Between the RS and the relay MS, a DL denotes communication from the RS to the relay MS, and a UL denotes communication from the relay MS to the RS. In DL, a transmitter may be a part of the BS or the RS, and a receiver may be a part of the MS or the RS. In UL, a transmitter may be a part of the MS or the RS, and a receiver may be a part of the BS or the RS.

Figure 2:
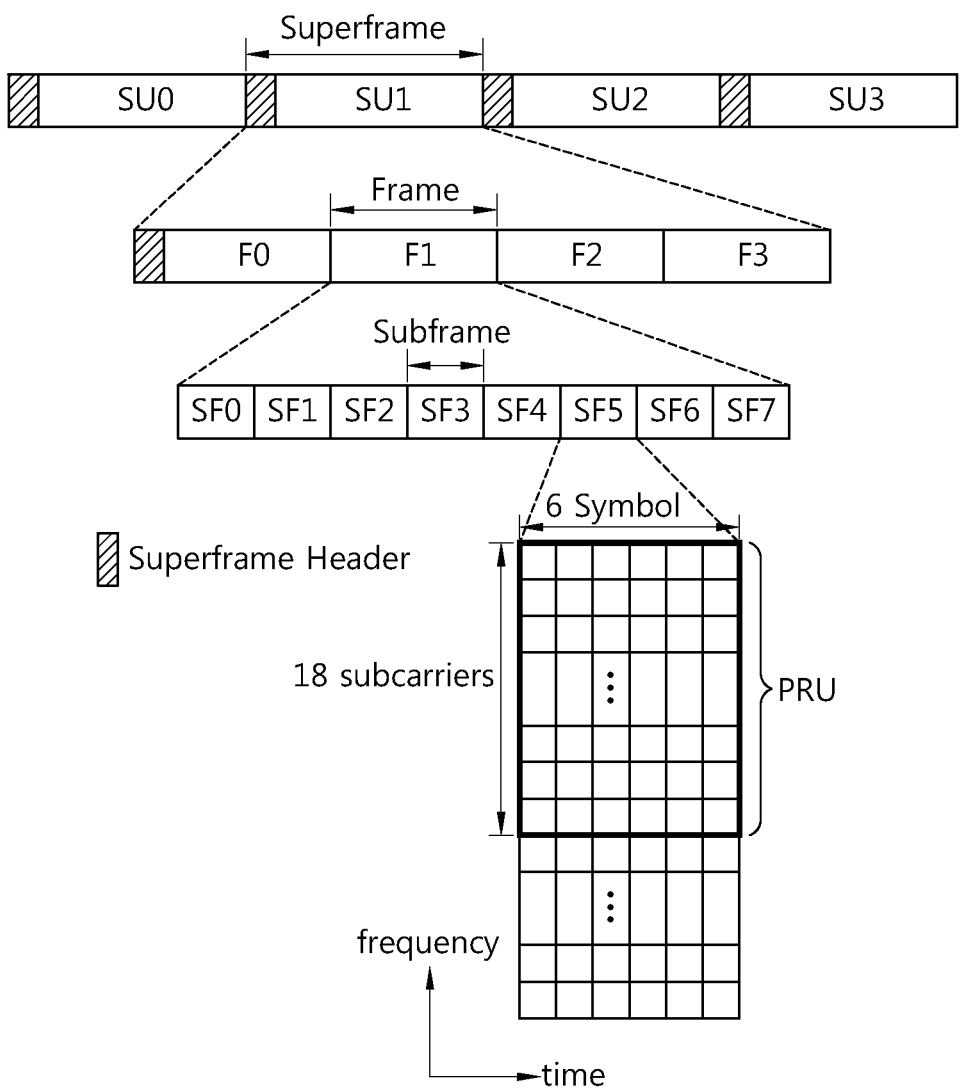
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7.

Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A superframe header (SFH) may carry an essential system parameter and system configuration information. The SFH may be located in a first subframe of a superframe. The SFH may occupy last 5 OFDMA symbols of the first subframe. The SFH can be classified into a primary-SFH (P-SFH) and a secondary-SFH (S-SFH). The P-SFH and the S-SFH may be transmitted in every superframe. The S-SFH may be transmitted in two consecutive superframes. Information transmitted on the S-SFH may be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP2 includes information on initial network entry and network discovery. The S-SFH SP3 includes other important system information.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| Channel bandwidth, BW(MHz) | 5 | 7 | 8.75 | 10 | 20 |
|---|---|---|---|---|---|
| Sampling factor, n | 28/25 | 8/7 | 8/7 | 28/25 | 28/25 |
| Sampling frequency, Fs(MHz) | 5.6 | 8 | 10 | 11.2 | 22.4 |
| FFT size, $N_{FFT}$ | 512 | 1024 | 1024 | 1024 | 2048 |
| Subcarrier spacing, $\Delta f$(kHz) | 10.94 | 7.81 | 9.77 | 10.94 | 10.94 |
| Useful symbol time Tb(μs) | 91.4 | 128 | 102.4 | 91.4 | 91.4 |

TABLE 1-continued

| | | | | | | | |
|---|---|---|---|---|---|---|---|
| G = 1/8 | | Symbol time, Ts(μs) | 102.857 | 144 | 115.2 | 102.857 | 102.857 |
| | FDD | Number of OFDMA symbols per 5 ms frame | 48 | 34 | 43 | 48 | 48 |
| | | Idle time(μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG(μs) | 165.714 | 248 | 161.6 | 165.714 | 165.714 |
| G = 1/16 | | Symbol time, Ts(μs) | 97.143 | 136 | 108.8 | 97.143 | 97.143 |
| | FDD | Number of OFDMA symbols per 5 ms frame | 51 | 36 | 45 | 51 | 51 |
| | | Idle time(μs) | 45.71 | 104 | 104 | 45.71 | 45.71 |
| | TDD | Number of OFDMA symbols per 5 ms frame | 50 | 35 | 44 | 50 | 50 |
| | | TTG + RTG(μs) | 142.853 | 240 | 212.8 | 142.853 | 142.853 |
| G = 1/4 | | Symbol time, Ts(μs) | 114.286 | 160 | 128 | 114.286 | 114.286 |
| | FDD | Number of OFDMA symbols per 5 ms frame | 43 | 31 | 39 | 43 | 43 |
| | | Idle time(μs) | 85.694 | 40 | 8 | 85.694 | 85.694 |
| | TDD | Number of OFDMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | | Left | 40 | 80 | 80 | 80 | 160 |
| | | Right | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s$ = floor(n · BW/8000) × 8000. A subcarrier spacing is defined as $\Delta f = F_s/NFFT$. A useful symbol time is defined as $Tb = 1/\Delta f$. A CP time is defined as $Tg = G · Tb$. An OFDMA symbol time is defined as $Ts = Tb + Tg$. A sampling time is defined as $Tb/NFFT$.

Figure 3:
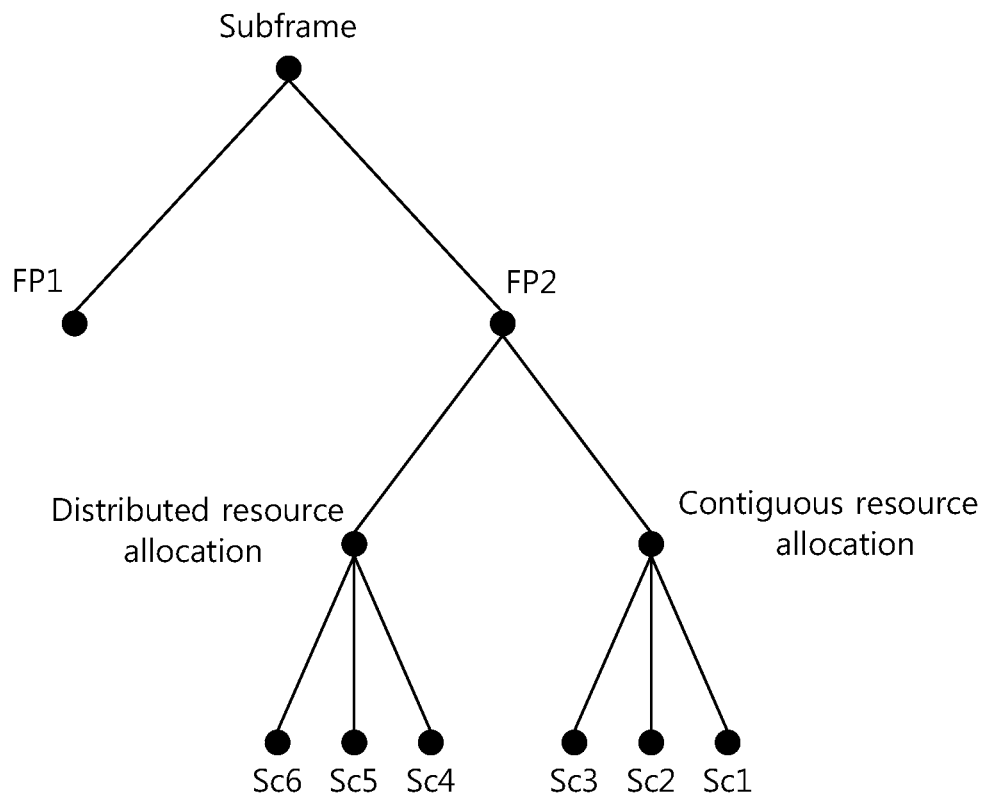
FIG. 3 shows an example of a downlink resource structure.

FIG. 3 shows an example of a downlink resource structure.

Each downlink subframe can be divided into 4 or less frequency partitions. Although a subframe is divided into two frequency partitions (i.e., FP1 and FP2) in FIG. 3, this is for exemplary purposes only, and thus the number of frequency partitions in the subframe is not limited thereto. Each frequency partition consists of at least one physical resource unit (PRU) across all available orthogonal frequency division multiple access (OFDMA) symbols in the subframe. In addition, each frequency partition may include contiguous/localized and/or distributed RRUs. Each frequency partition may be used for other purposes such as fractional frequency reuse (FFR). The FP2 of FIG. 3 includes both contiguous resource allocation and distributed resource allocation. 'Sc' denotes a subcarrier.

The PRU is a basic physical unit for resource allocation, and includes Psc contiguous subcarriers and Nsym contiguous OFDMA symbols. Psc may be 18. Nsym may be equal to the number of OFDMA symbols included in one subframe. Therefore, Nsym may be determined according to a subframe type. For example, when one subframe consists of 6 OFDMA symbols, the PRU can be defined with 18 subcarriers and 6 OFDMA symbols. A logical resource unit (LRU) is a basic logical unit for distributed and contiguous resource allocations. The LRU may include a pilot. Therefore, the number of subcarriers suitable for one LRU depends on the presence of the number of allocated pilots.

A distributed logical resource unit (DLRU) can be used to obtain a frequency diversity gain. The DLRU includes a group of subcarriers distributed in one frequency partition. A minimum unit of constituting the DLRU may be a tone pair which is a pair of a plurality of subcarriers. A downlink DLRU can be obtained by performing subcarrier permutation on a data subcarrier of a distributed resource unit (DRU). The DRU has the same size as the PRU. That is, Psc subcarriers and Nsym OFDMA symbols can be included.

A contiguous logical resource unit (CLRU) can be used to obtain a frequency selective scheduling gain. The DLRU includes a group of contiguous subcarriers in a resource allocated in a localized manner. The CLRU consists of a data subcarrier in a contiguous resource unit (CRU). The CRU has the same size as the PRU. The CLRU can be obtained by directly mapping the CRU. The CLRU can be divided into a subband LRU (SLRU) and a miniband LRU (NLRU) according to a type of the CRU which is a basis of the CLRU.

Meanwhile, a fractional frequency reuse (FFR) scheme can be used in a cellular system having multiple cells. The FFR scheme divides a full frequency band into a plurality of frequency partitions (FPs), and allocates the FP to each cell. According to the FFR scheme, different FPs can be allocated between neighbor cells, and the same FP can be allocated between cells separated far from each other. Therefore, intercell interference (ICI) can be reduced, and performance of a UE located in a cell edge can be increased.

Figure 4:
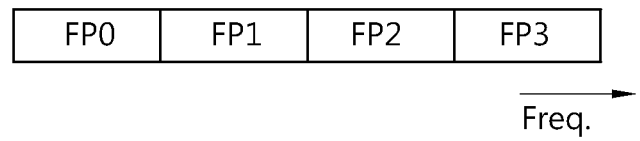
FIG. 4 shows an example of a method of dividing a full frequency band into a plurality of FPs.

FIG. 4 shows an example of a method of dividing a full frequency band into a plurality of FPs.

Referring to FIG. 4, the full frequency band is divided into a first FP (i.e., FP0), a second FP (i.e., FP1), a third FP (i.e., FP2), and a fourth FP (i.e., FP3). Each FP can be physically or logically divided from the full frequency band.

Figure 5:
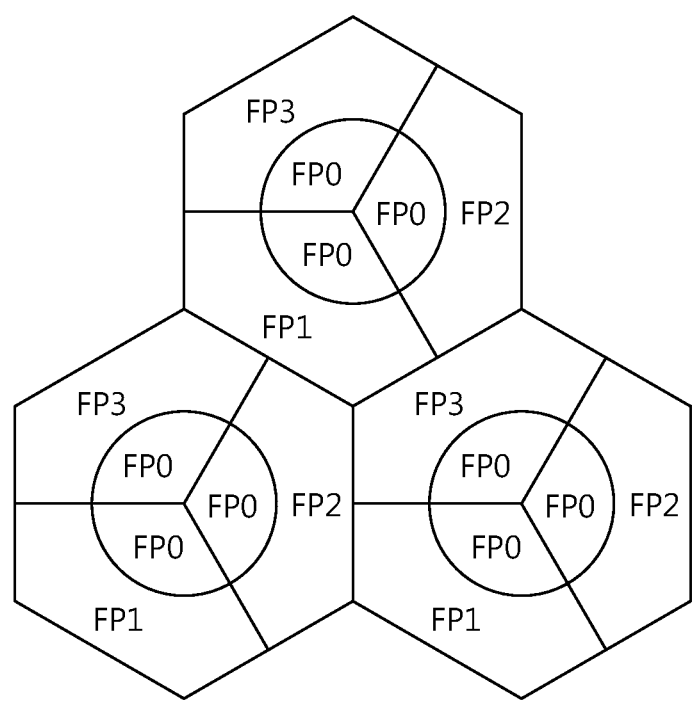
FIG. 5 shows an example of a cellular system using an FFR scheme.

FIG. 5 shows an example of a cellular system using an FFR scheme.

Referring to FIG. 5, each cell is divided into an inner cell and a cell edge. Further, each cell is divided into three sectors. It is assumed that a full frequency band is divided into four FPs (i.e., FP0, FP1, FP2, and FP3).

The first FP (i.e., FP0) is allocated in the inner cell. Any one of the second FP (i.e., FP1) to the fourth FP (i.e., FP3) is allocated in each sector of the cell edge. In this case, different FPs are allocated between neighbor cells. Hereinafter, an allocated FP is referred to as an active FP, and an unallocated FP is referred to as an inactive FP. For example, when the second FP (i.e., FP1) is allocated, the second FP is an active FP, and the third FP (i.e., FP2) and the fourth FP (i.e., FP3) are inactive FPs.

A frequency reuse factor (FRF) can be defined as the number of cells (or sectors) into which the full frequency band can be divided. In this case, the FRF may be 1 in the inner cell, and may be 3 in each sector of the cell edge.

When a plurality of cells exists, a downlink resource may be mapped by performing various processes such as subband partitioning, miniband permutation, frequency partitioning, etc. Such a process can be called a subchannelization process.

First, the subband partitioning process will be described.

Figure 6:
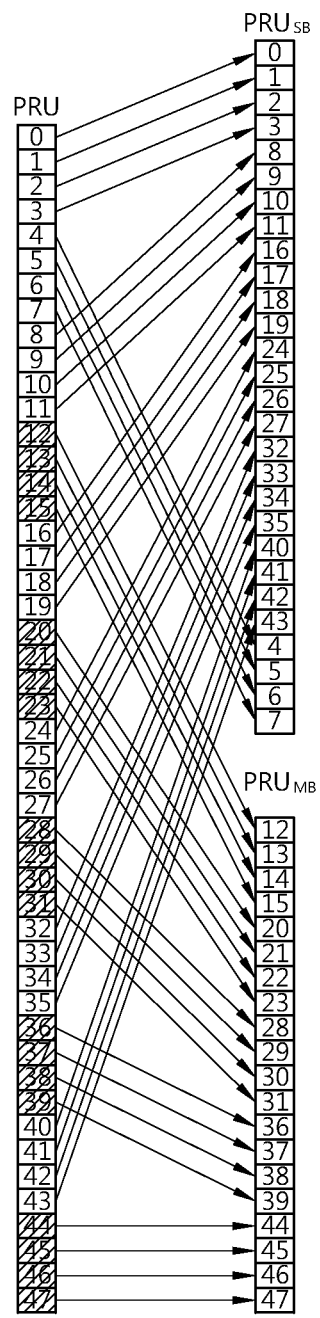
FIG. 6 shows an example of a subband partitioning process.

FIG. 6 shows an example of a subband partitioning process. A bandwidth of 10 MHz is used in the subband partitioning process of FIG. 6.

A plurality of PRUs is divided into a subband (SB) and a miniband (MB). The SB includes N1 contiguous PRUs, and the MB includes N2 contiguous PRUs. In this case, N1 may be 4 and N2 may be 1. The SB is suitable for frequency selective resource allocation since it provides contiguous allocation of PRUs in a frequency domain. The MB is suitable for frequency diverse resource allocation and may be permutated in the frequency domain.

The number of SBs can be denoted by $K_{SB}$. The number of PRUs allocated to the SBs can be denoted by $L_{SB}$, where $L_{SB}=N1*K_{SB}$. The $K_{SB}$ may vary depending on a bandwidth. PRUs remaining after being allocated to the SBs are allocated to MBs. The number of MBs can be denoted by $K_{MB}$. The number of PRUs allocated to the MBs can be denoted by $L_{MB}$, where $L_{MB}=N2*K_{MB}$. The total number of PRUs is $N_{PRU}=L_{SB}+L_{MB}$.

A plurality of PRUs is divided into a subband (SB) and a miniband (MB), and is reordered in an SB PRU ($PRU_{SB}$) and an MB PRU ($PRU_{MB}$). PRUs in the $PRU_{SB}$ are respectively indexed from 0 to ($L_{SB}-1$). PRUs in the $PRU_{MB}$ are respectively indexed from 0 to ($L_{MB}-1$).

Figure 7:
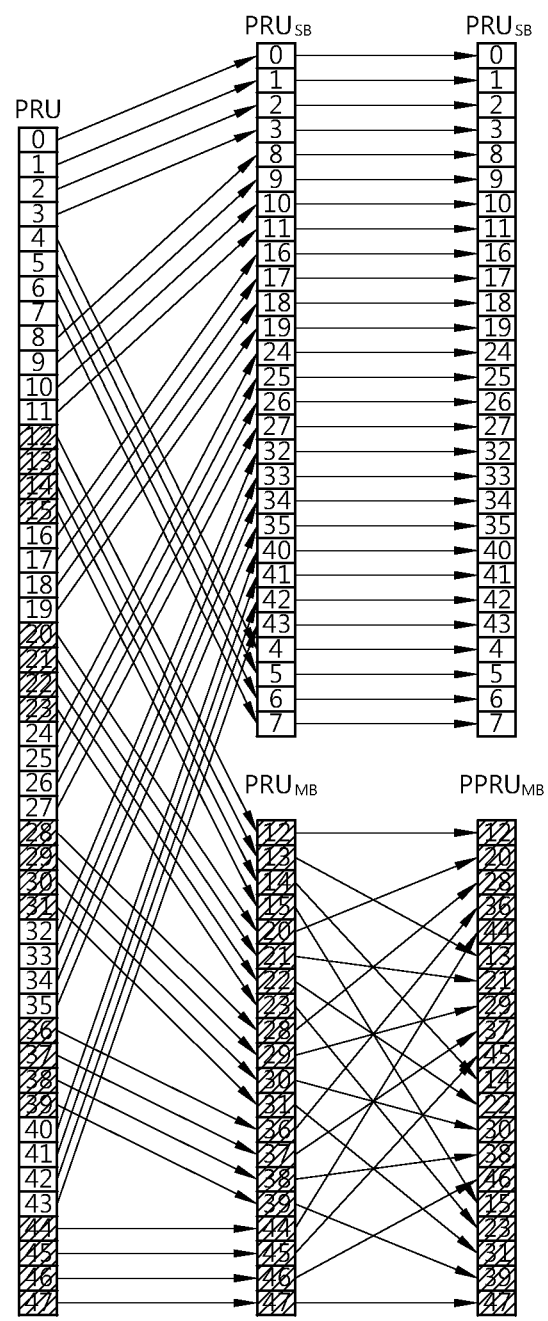
FIG. 7 shows an example of a miniband permutation process.

FIG. 7 shows an example of a miniband permutation process. The process of FIG. 7 can be performed subsequent to the subband partitioning process of FIG. 6 when using a bandwidth of 10 MHz. In the miniband permutation process, a $PRU_{MB}$ is mapped to a permutation PRU ($PPRU_{MB}$). This is to ensure frequency diversity in each frequency partition.

Figure 8:
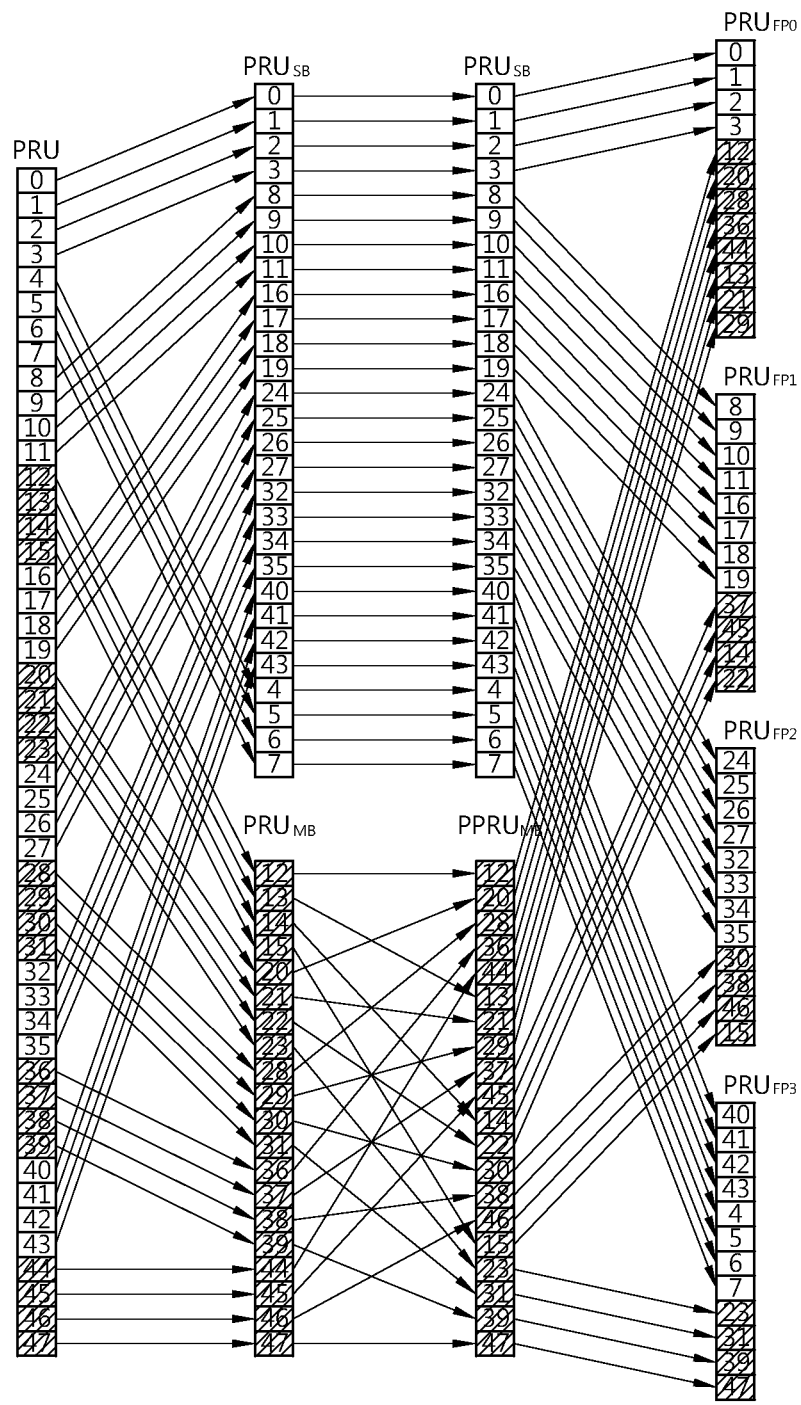
FIG. 8 shows an example of a frequency partitioning process.

FIG. 8 shows an example of a frequency partitioning process. The process of FIG. 8 can be performed subsequent to the subband partitioning process of FIG. 6 and the miniband permutation process of FIG. 7 when using a bandwidth of 10 MHz. PRUs of a $PRU_{SB}$ and a $PPRU_{MB}$ are allocated to at least one frequency partition. The maximum number of frequency partitions may be 4. Frequency partition configuration information may be determined by downlink frequency partition configuration (DFPC). The DFPC may have a different configuration according to a bandwidth, and may be broadcast by using an S-SFH or the like. The DFPC may have a length of 3 bits or 4 bits. The DFPC may indicate a size of a frequency partition, the number of frequency partitions, etc. A frequency partition count (FPCT) denotes the number of frequency partitions. FPSi denotes the number of PRUs allocated to an FPi. Further, a downlink frequency partition subband count (DFPSC) defines the number of SBs allocated to the FPi (where i>0). The DFPSC may have a length of 1 to 3 bits.

The number of SBs in the FPi can be denoted by $K_{SB,FPi}$. The number of SB PRUs of each frequency partition can be denoted by $L_{SB,FPi}$, where $L_{SB,FPi}=N1*K_{SB,FPi}$. The number of MBs of the FPi can be denoted by $K_{MB,FPi}$. The number of MB PRUs of each frequency partition can be denoted by $L_{MB,FPi}$, where $L_{MB}=N2*K_{MB}$. The SB PRU and MB PRU in each frequency partition are mapped to a $PRU_{FPi}$.

The aforementioned SB partitioning, MB permutation, and frequency partitioning process corresponds to a resource mapping process for a plurality of cells. After performing resource mapping for the plurality of cells, cell-specific resource mapping can be performed. The cell-specific resource mapping can include CRU/DRU allocation, subcarrier permutation, etc. By using the cell-specific mapping, the $PRU_{Fpi}$ is mapped to an LRU, and this can be performed only in one frequency partition.

The $PRU_{FPi}$ can be divided into a CRU and a DRU in one frequency partition. CRU/DRU allocation can be performed on a sector basis. PRUs allocated from the $PRU_{MB}$ are allocated to the CRU, and PRUs allocated from the $PRU_{MB}$ are allocated to the DRU. However, in the FP0, some of the PRUs allocated from the $PRU_{MB}$ can be allocated to a subband. This is because resource allocation needs to be performed frequency selectively in general in the FP0 which uses a center frequency band.

In the FPi, the number of SB-based CRUs (hereinafter, SB CRU) can be denoted by $L_{SB\text{-}CRU,FPi}$, and the number of MB-based CRU (hereinafter, MB CRU) can be denoted by $L_{MB\text{-}CRU,FPi}$. The total number of SBs and MBs allocated in the FPi measured in a unit of N1 can be denoted by DCASi which is a size of downlink CRU allocation. In addition, the number of SB CRUs allocated in the FP0 can be denoted by $DCAS_{SB,0}$ on an SB basis, and the number of MB CRUs can be denoted by $DCAS_{MB,0}$ on an MB basis. Regarding the FP0, $DCAS_{SB,0}$ and $DCAS_{MB,0}$ can be broadcast through an SFH. $DCAS_{SB0}$ and $DCAS_{MB0}$ may have a length of 3 to 5 bits. $DCAS_{MB0}$ can vary depending on a bandwidth size.

Subcarriers allocated to the DRU can be distributed to a full resource region in one frequency partition by using a subcarrier permutation process.

A frame structure in a wireless communication system introducing a relay station is described below.

The aforementioned frame structures in FIG. 2 can apply between a BS and a macro MS. However, when a wireless communication system includes an RS, it is difficult to apply to the RS the same frame structure applied between the BS and the macro MS. The RS requires a radio resource region for DL transmission with respect to a relay MS connected to the RS. Further, since the RS receives a signal from the relay MS and thereafter decodes and transmits it to the BS, the RS requires a radio resource region for UL transmission. The RS can transmit a signal to an MS connected to the RS or can receive a signal from the BS in the same frequency band. Further, the RS can receive a signal from the MS connected to the RS or can transmit a signal to the BS in the same frequency band. Therefore, the RS requires a transition gap when switching a transmission/reception operation of a signal. In general, it is assumed that the RS cannot transmit or receive a signal in the transition gap.

As a preamble, the RS can use a unique sequence different from that used in the BS. In this case, by analyzing a sequence received through the preamble, the MS can know whether the MS receives a service provided by the BS or the RS. This is referred to as awareness. Since the MS can be aware of whether the MS receives the service provided by the RS, the RS can use a frame structure different from that used in the BS. A frame structure for the RS may include a subframe including a transition gap. In communication between the RS and the MS, the MS may perform transmission and reception of signals according to a frame structure different from a frame structure used for communication with the BS. If the MS is not aware of whether the MS receives the service provided by the BS or the RS, the frame structure and the transition gap have to be determined so that the MS can use a service of the RS without any difference from the BS. In this case, the frame structure between the RS and the BS may be different from the frame structure between the MS and the BS. The RS receives frame configuration information regarding an RS frame from the BS, and configures the RS frame according to the frame configuration information. In the RS frame, the frame configuration information may include information indicating a radio resource region for communication with the relay MS and a radio resource region for communication with the BS. The BS can transmit the frame configuration information by including it in DL control information. For example, the frame configuration information can be transmitted by being included in a superframe header (SFH). In this case, the frame configuration information can apply to a plurality of frames. The RS frame configured according to the frame configuration information will be described below in detail. The RS transmits or receives a signal to the MS connected to the RS or to the BS according to the configured RS frame structure.

Figure 9:
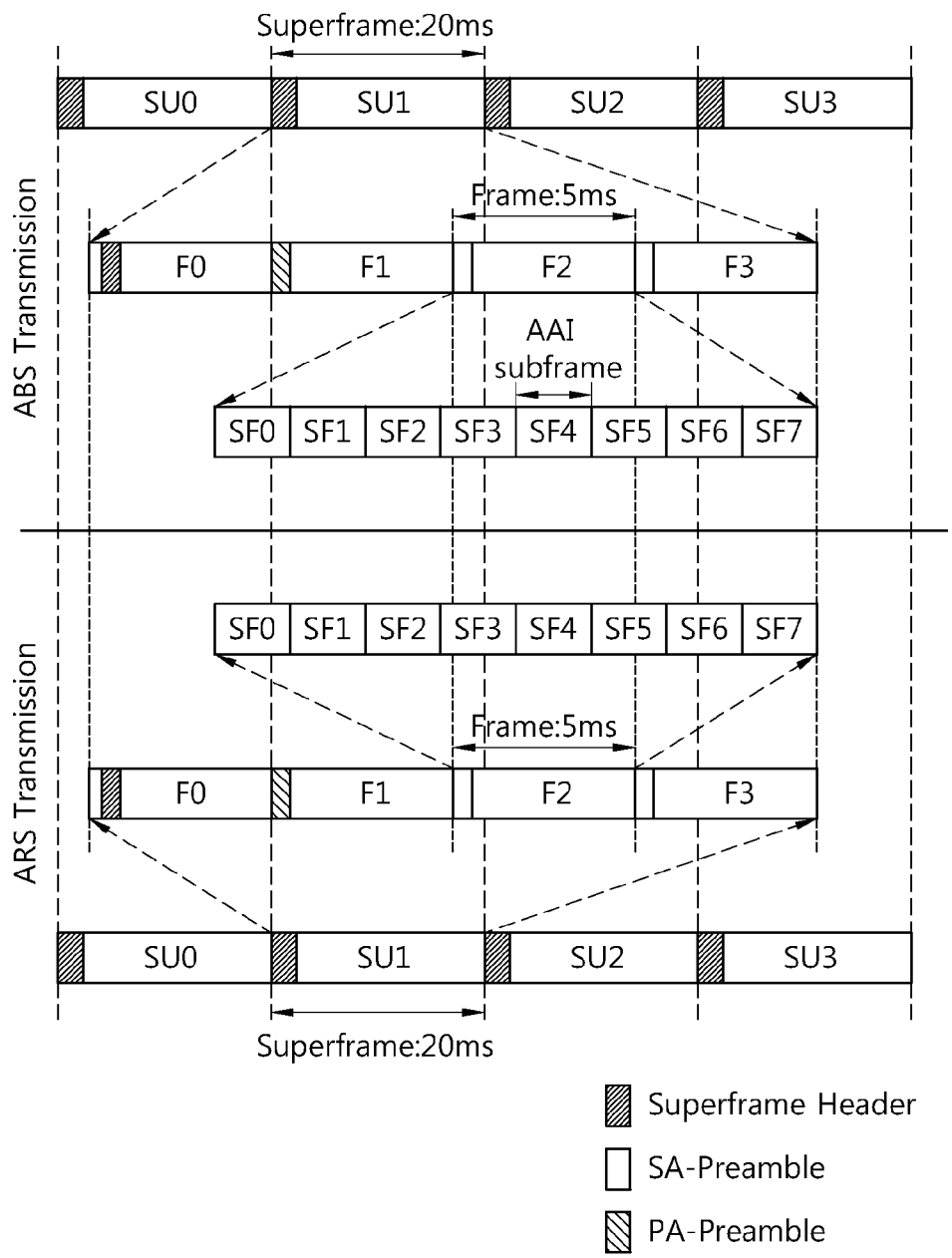
FIG. 9 shows an example of a frame structure of a system including an RS.

FIG. 9 shows an example of a frame structure of a system including an RS.

OFDMA parameters of Table 1 can be directly used in the system including the RS. Superframes of a BS and an MS can be time aligned, and include the same number of frames and subframes. Each RS superframe includes an SFH. An SFH transmitted by the RS has the same location and the same format as an SFH transmitted by the BS. An RS preamble (i.e., SA-preamble and PA-preamble) and a super-ordinate BS preamble are transmitted simultaneously.

The RS conforms to a frame structure of a basic IEEE 802.16m system. In a simultaneous transmit receive (STR) relay, a BS-RS frame structure and an RS-MS frame structure are the same as a BS-MS frame structure. In a time-division transmit and receive (TTR) relay, a BS-RS frame and a MS frame are transmitted by using time division multiplexing. Hereinafter, the TTR relay will be described.

In the system supporting the RS, the BS frame is divided into an access zone and a relay zone. In the frame, the access zone can be located ahead of the relay zone. Alternatively, in the FDD system, the relay zone can be located ahead of the access zone in a UL frame. A duration of the access zone and the relay zone is different between DL and UL. The access zone and the relay zone can be configured by using an AAI_ARS-CONFIG_CMD message transmitted by the BS.

In a BS frame, an access zone consists of a DL access zone and a UL access zone, and a relay zone consists of a DL relay zone and a UL relay zone. The BS frame access zone is used to communicate with only the MS. The BS frame relay zone can be used to communicate with the RS, and can be used to communicate with the MS. In the DL relay zone, the BS transmits a signal to a sub-ordinate RS. In the UL relay zone, the BS receives a signal from the sub-ordinate RS.

In an RS frame, an access zone consists of a DL access zone and a UL access zone, and a relay zone consists of a DL relay zone and a UL relay zone. The RS frame access zone is used to communicate with only the MS. In the DL relay zone, the RS receives a signal from a super-ordinate BS. In the UL relay zone, the RS transmits a signal to the super-ordinate BS.

When the RS or the MS receives a frame configuration index through an S-SFH SP1, DL/UL access and relay zones are configured in a frame.

A relay transmit to receive transition interval (R-TTI) can be inserted in each RS frame. The R-TTI can be inserted for an ARS transmit/receive transition gap (ARSTTG) and a round-trip delay (RTD) between the RS and a super-ordinate station. In addition, a relay receive to transmit transition interval (R-RTI) can be inserted in each RS frame. The R-RTI can be inserted for an ARS receive/transmit transition gap (AR-SRTG) and an RTD between the RS and the super-ordinate station.

Figure 10:
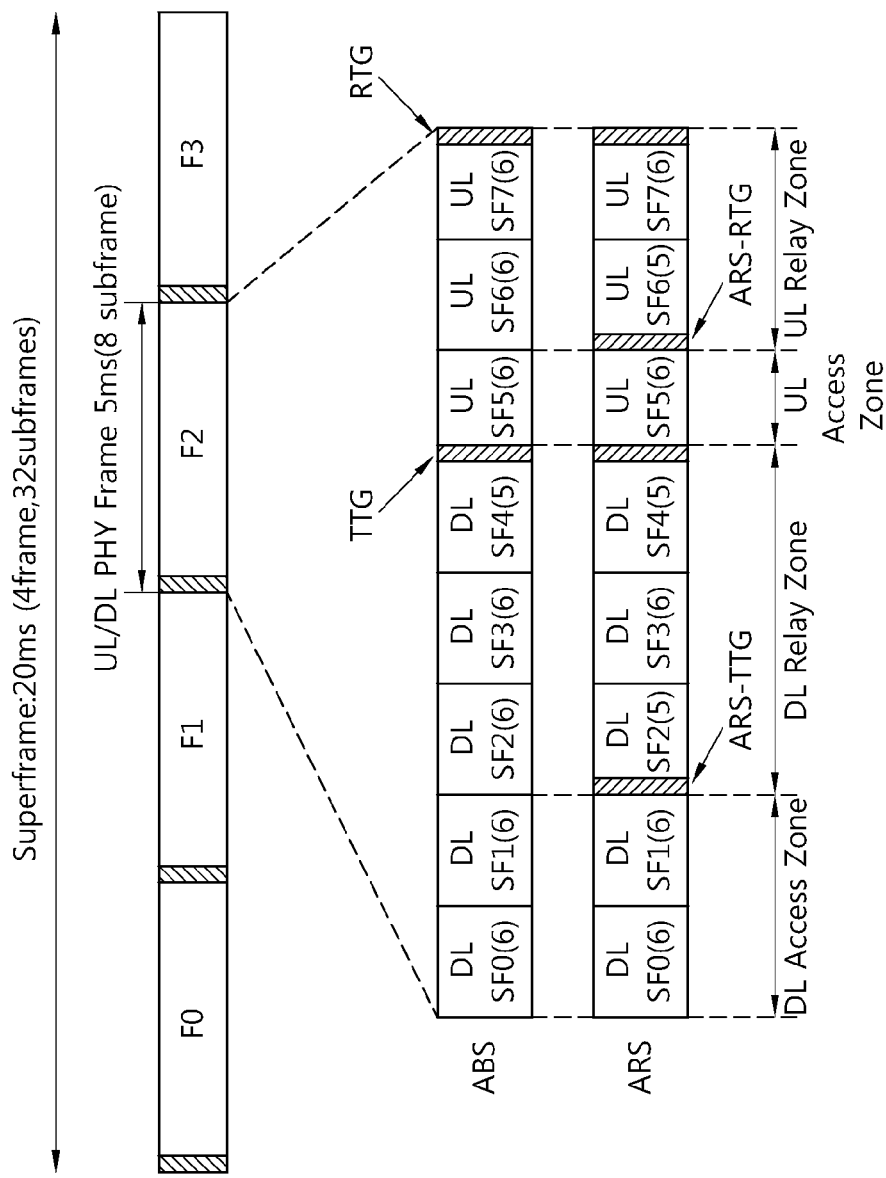
FIG. 10 shows another example of a frame structure of a system including an RS.

FIG. 10 shows another example of a frame structure of a system including an RS.

Referring to FIG. 10, each frame includes 8 subframes. The number of DL subframes and the number of UL subframes included in one frame may be respectively 5 and 3. The number of subframes and the number of DL subframes included in one frame may change variously.

In a BS frame, a transmit/receive transition gap (TTG) can be allocated between a DL region and a UL region. The TTG can be allocated to a last OFDMA symbol of the DL region. In addition, in the BS frame, a receive/transmit transition gap (RTG) can be allocated between the UL region and the DL region. The RTG can be allocated to a last OFDMA symbol of the UL region.

In an RS frame, a DL region can be divided into a DL access zone and a DL relay zone. Although it is assumed that the DL access zone occupies two DL subframe and the DL relay zone occupies three DL subframes, the present invention is not limited thereto. In the DL relay zone, a signal is transmitted from the BS to the RS. The ARS-TTG can be allocated between the DL access zone and the DL relay zone. The ARG-TTG is a transition time for changing an RF operation of the RS from a transmission mode to a reception mode. The ARS-TTG can be allocated to a first OFDMA symbol of the DL relay zone. In addition, the UL region can be divided into a UL access zone and a UL relay zone. Although it is assumed that the UL access zone occupies one UL subframe and the UL relay zone occupies two UL subframes, the present invention is not limited thereto. In the UL relay zone, a signal is transmitted from the RS to the BS. The ARS-RTG can be allocated between the UL access zone and the UL relay zone. The ARG-RTG is a transition time for changing the RF operation of the RS from the reception mode to the transmission mode. The ARS-RTG can be allocated to a first OFDMA symbol of the UL relay zone.

In general, the BS and the RS almost not move and can be located in a place having good link quality. Therefore, link quality between the BS and the RS is better than link quality between the BS and the UE. Accordingly, when data is transmitted using a MIMO scheme, a closed-loop (CL) MIMO scheme can be used. The CL MIMO scheme is a MIMO scheme for scheduling a wireless resource by using information regarding channel or link quality which is fed back by the BS from the UE or the RS. On the other hand, an open-loop (OL) MIMO scheme is a MIMO scheme in which information regarding channel or link quality which is fed back by the BS from the UE or the RS is not used in scheduling of the wireless resource. When using the CL MIMO scheme, an SB CRU is preferably allocated.

Meanwhile, in a subchannelization process, the BS can determine a parameter for determining the number of frequency partitions, the number of CRUs in the frequency partition, the number of SB CRUs/MB CRUs/DRUs, etc., according to UEs connected to the BS. In the wireless communication system including the RS, not only the UEs connected to the BS but also the RS must be taken into account in the subchannelization process. Accordingly, a new method different from the conventional subchannelization method can be required.

Hereinafter, the wireless resource allocation method in the wireless communication system including the RS according to the present invention will be described. Subchannelization of a relay zone of a BS frame can be performed in the wireless communication system including the RS according to the present invention. In the following description, a parameter related to subchannelization (hereinafter, a subchannelization parameter) may include the number of frequency partitions (FPCT), the number of CRUs in the frequency partition (CASi), the number of SB CRUs in the FP0 ($CAS_{SB,0}$), or the number of MB CRUs in the FP0 ($CAS_{MB,0}$). In addition, the proposed method can apply to the subchannelization process of both a DL resource and a UL resource.

1) The subchannelization process of the relay zone of the BS frame may be the same as a subchannelization process of an access zone of the BS frame. In addition, a wireless resource subjected to the subchannelization process is allocated to the RS and the UE without distinction. In this case, the subchannelization parameter of the relay zone is the same as the subchannelization parameter of the access zone. Similarly to the subchannelization parameter of the access zone, the subchannelization parameter of the relay zone can be broadcast through an SFH or can be transmitted to the UE through an ABI, a message, a MAP, or the like. Accordingly, an RS and a UE connected to the BS can be simultaneously allocated to the relay zone, and there is no need to separately transmit to the UE a signal for reporting the presence of the RS. That is, the presence of the RS is transparent to the UE.

2) Alternatively, the subchannelization process of the relay zone can be the same as the subchannelization process of the access zone, while a wireless resource subjected to the subchannelization process can be allocated to the RS and the UE distinctively. Since the subchannelization process of the relay zone is the same as the subchannelization process of the access zone, the subchannelization parameter of the relay zone is the same as the subchannelization parameter of the access zone, and the subchannelization parameter of the relay zone can be broadcast through an SFH or can be transmitted to the UE through an ABI, a message, a MAP, or the like. Accordingly, an RS and a UE connected to the BS can be simultaneously allocated to the relay zone, and there is no need to separately transmit to the UE a signal for reporting the presence of the RS. That is, the presence of the RS is transparent to the UE.

As a wireless resource for the RS, the remaining wireless resources other than a resource allocated to the DRU can be allocated to the RS. Resource allocation information for the RS is reported through a relay-MAP (R-MAP) and can be based on a physical subband index. The physical subband may have a format in which four PRUs are grouped in a physical domain. The physical subband index may have a format in which a subband index is expressed in a bitmap, or may be expressed by a start point of the physical subband and the number of physical subbands allocated for the RS. Since the subchannelization process of the relay zone is the same as the conventional subchannelization process of the wireless resource, a PRU index of a resource allocated to the CRU or the DRU can be known according to resource allocation information for the RS, and thus the remaining PRUs other than the PRU used as the DRU can be allocated to the RS. In addition, PRUs allocated for the CL-MIMO scheme can be used as the SB CRU. That is, all data transmission performed by the RS can be performed through the SB CRU. Alternatively, a method of using PRUs allocated through additional signaling can be indicated when resources are allocated for the RS. For example, if the number of PRUs that can be used in the allocated physical SB CRU is greater than or equal to a specific number, the PRUs can be used as the SB CRU, and otherwise if the number of PRUs is less than or equal to the specific number, the PRUs can be used as the MB CRU.

Figure 11:
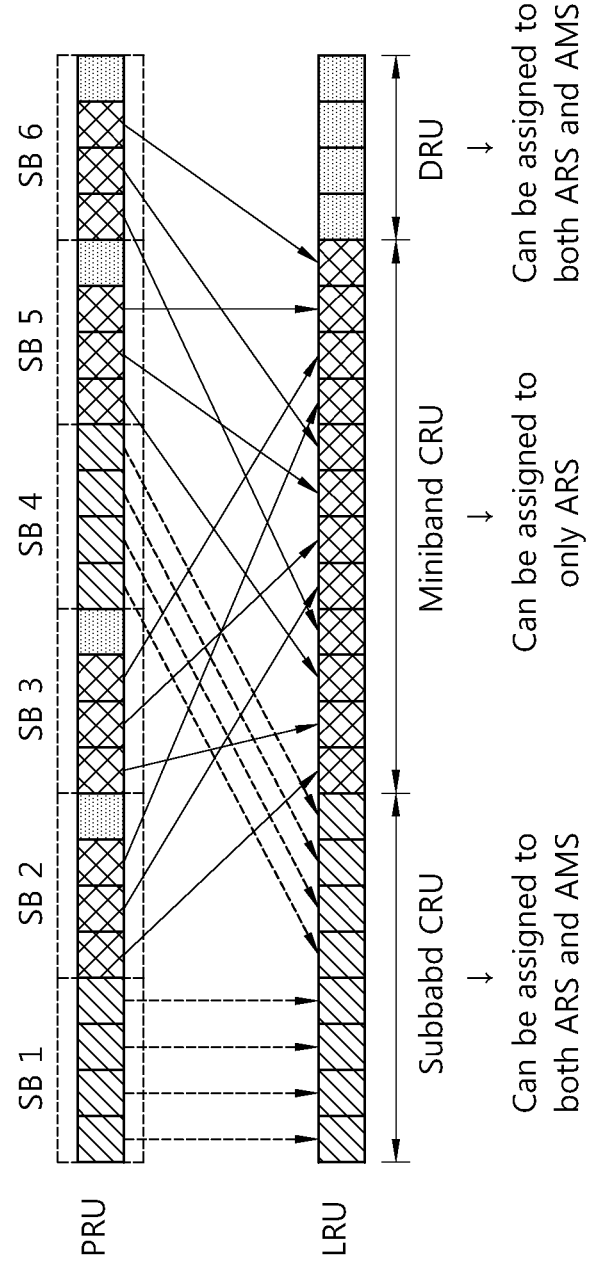
FIG. 11 shows an example of a subchannelization process of a relay zone according to the proposed wireless resource allocation method.

FIG. 11 shows an example of a subchannelization process of a relay zone according to the proposed wireless resource allocation method.

A plurality of PRUs is mapped from a physical domain to a logical domain through the subchannelization process. The plurality of PRUs can be sub-channelized by constituting a physical subband in a unit of four PRUs, and the subchannelization process can be the same as the conventional subchannelization process. In the subchannelization process, the plurality of physical subbands are divided into an SB and an MB by an SB partitioning process, and physical SBs SB and SB4 mapped to an SB are allocated to an SB CRU. The SB CRU can be allocated to both a BS and a UE. The remaining physical SBs SB2, SB3, SB5, and SB6 which are mapped to an MB are allocated to an MB CRU or DRU. In this case, a PRU allocated to the MB CRU and a PRU allocated to the DRU can coexist in physical SBs having the same index. According to the proposed invention, among the physical SBs having the same index, the PRU allocated to the MB CRU can be allocated only for the RS. In this case, the PRU allocated to the DRU among the physical SBs having the same index can be implicitly excluded. The PRU allocated to the DRU can be allocated to both the BS and the UE. Accordingly, only the SB CRU or DRU can be allocated to the UE.

Meanwhile, a location of a PRU used as a DRU can indicate a PRU used as a DRU in all frequency partitions or can indicate a PRU used as a DRU in an FP0 which is a first frequency partition. Alternatively, it may indicate a PRU used as a DRU in a primary frequency partition for transmission of ACK/NACK designated by an SFH or non-user specific A-MAP. For example, in case of indicating the PRU used as the DRU in the FP0, a PRU allocated to a DRU in a physical SB allocated to the FP0 is not allocated to the RS, but a PRU allocated to a DRU in a physical SB allocated to the remaining frequency partition can be allocated to the RS. In this case, the DRU of the remaining frequency partitions other than the FP0 may not be allocated to the UE.

In order to allocate an MB CRU to the UE, information related thereto must be signaled to the RS. In this case, the remaining MB CRUs other than the MB CRU allocated to the UE can be used as the SB CRU similarly to the above description.

Figure 12:
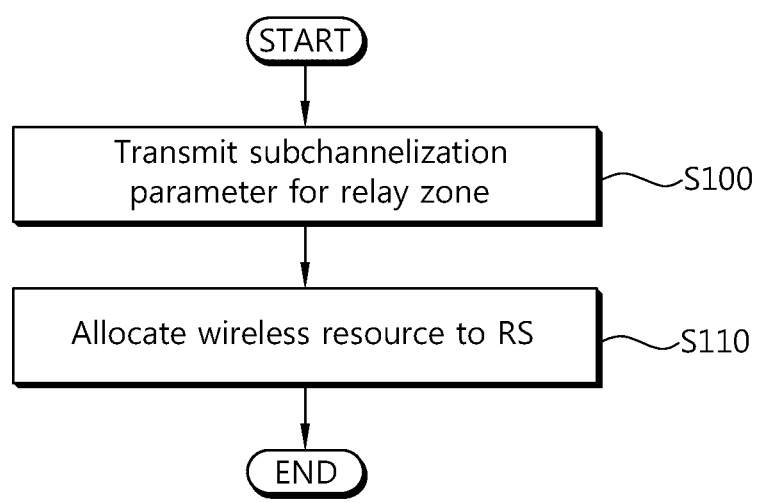
FIG. 12 is a flowchart showing an embodiment of the proposed wireless resource allocation method.

FIG. 12 is a flowchart showing an embodiment of the proposed wireless resource allocation method.

In step S100, a BS transmits a subchannelization parameter for a relay zone to an RS or a UE through an SFH, an ABI, a message, or a MAP. The subchannelization parameter may be a subchannelization parameter commonly used by the RS and the UE. In step S110, the BS allocates a wireless resource to the RS on the basis of the subchannelization parameter. In this case, the wireless resource allocated to the RS may be the remaining wireless resources other than a wireless resource allocated to a DRU.

3) A subchannelization process of a relay zone can be performed differently from a subchannelization process of an access zone. Accordingly, a subchannelization parameter of the relay zone may be different from a subchannelization parameter of the access zone. The subchannelization parameter of the relay zone can be transmitted to the RS and the UE through an SFH, an ABI, a message, or a MAP. The UE and the RS connected to the BS can be simultaneously allocated to the relay zone. However, a signal for reporting the presence of the RS needs to be transmitted to the RS and the UE through the SFH or the ABI.

Figure 13:
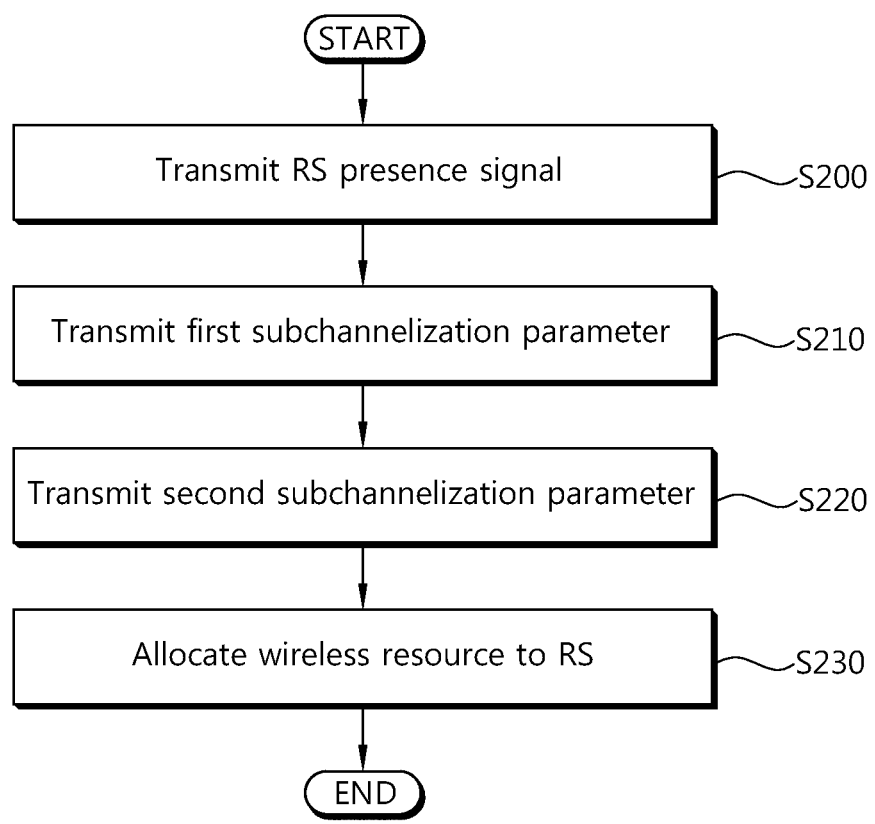
FIG. 13 is a flowchart showing another embodiment of the proposed wireless resource allocation method.

FIG. 13 is a flowchart showing another embodiment of the proposed wireless resource allocation method.

In step S200, a BS transmits an RS presence signal to an BS and a UE to report the presence of the RS. A signal for determining a frame structure can be transmitted together with the RS presence signal. The RS presence signal can be transmitted through an SFH or an ABI. In step S210, the BS transmits a first subchannelization parameter for a relay zone to the RS and the UE through the ABI. The first subchannelization parameter may be a subchannelization parameter commonly used by the RS and the UE. The first subchannelization parameter can be transmitted to the RS and the UE through the relay zone or can be transmitted to the RS through the relay zone or can be transmitted to the UE through an access zone. In step S220, the BS transmits a second subchannelization parameter for the relay zone to the RS through a message. The second subchannelization parameter may be a subchannelization parameter used only for the RS. In step S230, the BS allocates a wireless resource to the RS on the basis of the first and second subchannelization parameters.

4) The subchannelization process of the relay zone can be different from the subchannelization process of the access zone, while a subchannelization parameter for the relay zone can be known to the RS and the UE without having to explicitly transmit the subchannelization parameter for the relay zone. The subchannelization parameter for the relay zone may be different from the subchannelization parameter of the access zone. Without having to explicitly transmit the subchannelization parameter for the relay zone, various types of subchannelization parameters can be predetermined. For example, a frequency partition count (FPCT) can be set to 1. The number of SB CRUs and the number of MB CRUs in a specific frequency partition can also be predetermined, and the number of CRUs in a specific frequency partition can also be predetermined. The number of DRUs can be set to be equal to the number of DRUs of an access zone of a BS frame or can be set to a fixed number. The UE and the RS connected to the BS can be simultaneously allocated to the relay zone. However, a signal for reporting the presence of the RS needs to be transmitted to the RS and the UE through the SFH or the ABI.

Meanwhile, if the subchannelization parameter of the relay zone is different from the subchannelization parameter of the access zone, the presence of the RS needs to be transmitted to the UE, which may act as a signaling overhead. Therefore, a method of implicitly reporting the presence of the RS to the UE without having to signal the presence of the RS can be proposed. For example, the presence of the RS can be reported to the UE by changing a location at which a midamble is transmitted for a case where the RS is present and for a case where the RS is absent. The midamble is transmitted in the access zone when the RS is absent. The midamble is transmitted in the relay zone when the RS is present. The UE attempts to receive the midamble in the access zone by assuming that the RS is absent. If the midamble is successfully received, it can be known that the RS is absent, and if the reception of the midamble fails, it can be known that the RS is present.

Figure 14:
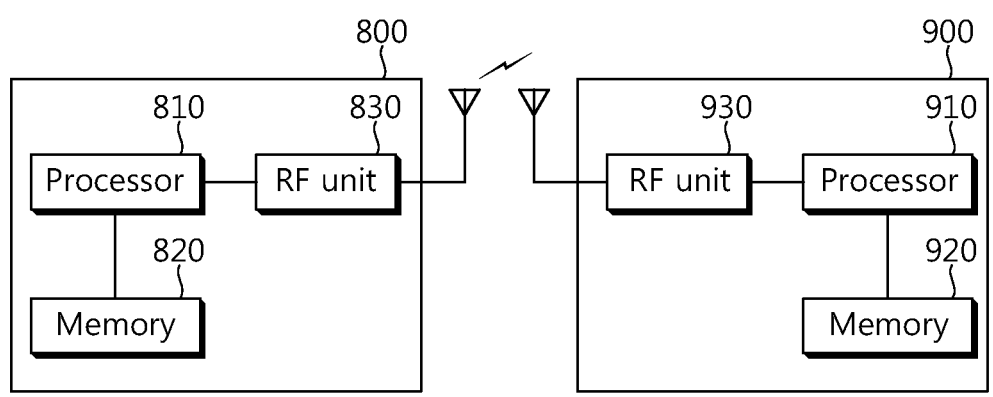
FIG. 14 is a block diagram showing a BS and an RS for implementing an embodiment of the present invention.

FIG. 14 is a block diagram showing a BS and an RS for implementing an embodiment of the present invention.

A BS 800 includes a processor 810, a memory 820, and a radio frequency (RF) unit 830. The processor 810 implements the proposed functions, processes, and/or methods. The processor 810 transmits a subchannelization parameter for a relay zone, and allocates a wireless resource to the RS on the basis of the subchannelization parameter. Layers of a wireless interface protocol can be implemented by the processor 810. The memory 820 is coupled to the processor 810, and stores a variety of information for driving the processor 810. The RF unit 830 is coupled to the processor 810, and transmits and/or receives a radio signal.

An RS 900 includes a processor 910, a memory 920, and an RF unit 930. The RF unit 930 is coupled to the processor 910, and transmits and/or receives a radio signal. The processor 910 implements the proposed functions, processes, and/or methods. Layers of a wireless interface protocol can be implemented by the processor 910. The memory 920 is coupled to the processor 910, and stores a variety of information for driving the processor 910.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for allocating a wireless resource in a wireless communication system including a relay station, the method comprising:

transmitting, by a base station, a subchannelization parameter for a relay zone; and allocating, by the base station, the wireless resource to the relay station on the basis of the subchannelization parameter, wherein the relay zone is a region for transmitting a signal from the base station to the relay station or receiving the signal from the relay station within a frame, and wherein the wireless resource allocated to the relay station is the remaining physical resource units (PRUs) other than PRUs allocated to a distributed resource unit (DRU).

2. The method of claim 1, wherein the wireless resource allocated to the relay station is allocated to a subband contiguous resource unit (CRU).

3. The method of claim 1, wherein the wireless resource allocated to the relay station is determined on the basis of a physical subband index of the PRUs in a physical domain.

4. The method of claim 1, wherein the PRU allocated to the DRU is included in some or all of a plurality of frequency partitions.

5. The method of claim 1, wherein the subchannelization parameter includes at least one of the number of frequency partitions, the number of CRUs in a specific frequency partition, and the number of subband CRUs or subband DRUs in a first frequency partition.

6. The method of claim 1, wherein the subchannelization parameter is transmitted through one of a superframe header (SFH), an advanced broadcast information (ABI), a message, and a MAP.

7. The method of claim 1, further comprising:
   transmitting, by the base station, a signal indicating a usage of the wireless resource allocated to the relay station.

8. The method of claim 1, further comprising:
   transmitting, by the base station, a relay station presence signal indicating the presence of the relay station.

9. The method of claim 8, wherein the relay station presence signal is transmitted through an SFH or an ABI.

10. An apparatus for allocating a wireless resource, the apparatus comprising:
    a radio frequency (RF) unit for transmitting and receiving a radio signal; and
    a processor coupled to the RF unit,
    wherein the processor is configured for:
       transmitting a subchannelization parameter for a relay zone; and
       allocating the wireless resource to the relay station on the basis of the subchannelization parameter,
       wherein the relay zone is a region for transmitting a signal from a base station to the relay station or receiving the signal from the relay station within a frame, and
       wherein the wireless resource allocated to the relay station is the remaining physical resource units (PRUs) other than PRUs allocated to a distributed resource unit (DRU).

11. The apparatus of claim 10, wherein the wireless resource allocated to the relay station is allocated to a subband contiguous resource unit (CRU).

12. The apparatus of claim 10, wherein the wireless resource allocated to the relay station is determined on the basis of a physical subband index of the PRUs in a physical domain.

13. The apparatus of claim 10, wherein the PRU allocated to the DRU is included in some or all of a plurality of frequency partitions.

* * * * *